United States Patent
Harris et al.

(10) Patent No.: US 11,748,581 B2
(45) Date of Patent: Sep. 5, 2023

(54) CREDIT CARD HOLDER ASSEMBLY

(71) Applicants: Barbara Harris, Belleville, IL (US); Priscilla Redd Brown, Belleville, IL (US)

(72) Inventors: Barbara Harris, Belleville, IL (US); Priscilla Redd Brown, Belleville, IL (US)

( * ) Notice: Subject to any disclaimer, the term of this patent is extended or adjusted under 35 U.S.C. 154(b) by 0 days.

(21) Appl. No.: 17/543,873

(22) Filed: Dec. 7, 2021

(65) Prior Publication Data

US 2023/0177285 A1 Jun. 8, 2023

(51) Int. Cl.
 *G06K 7/00* (2006.01)
(52) U.S. Cl.
 CPC ................... *G06K 7/0086* (2013.01)
(58) Field of Classification Search
 CPC ..................................... G06K 7/0086
 See application file for complete search history.

(56) References Cited

U.S. PATENT DOCUMENTS

| | | | |
|---|---|---|---|
| 4,817,253 A | 4/1989 | Harmatuik | |
| 5,159,730 A | 11/1992 | Radvin | |
| 5,640,742 A | 6/1997 | White | |
| 7,174,607 B1 | 2/2007 | Buettell | |
| D957,242 S * | 7/2022 | Dye | D8/395 |
| 2004/0045133 A1 | 3/2004 | Buettell | |
| 2011/0147422 A1* | 6/2011 | Maier-Hunke | A45F 5/00 224/269 |

FOREIGN PATENT DOCUMENTS

CN 210076815 2/2020

* cited by examiner

*Primary Examiner* — Seung H Lee

(57) ABSTRACT

A credit card holder assembly for inserting a credit card or debit card into a card reader includes a pair of arms that is each pivotally coupled together having each of the arms being oriented parallel to each other. Each of the arms is biased apart from each other for having a credit card inserted between the arms. Each of the arms is urgeable to engage each other to compress the credit card between the pair of arms. In this way the credit card can be inserted into and removed from a credit card reader without requiring a user to touch the credit card reader. A key ring is disposed on the pair of arms such that the key ring can be attached to a user's keys for carrying the pair of arms.

11 Claims, 3 Drawing Sheets

CREDIT CARD HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holder devices and more particularly pertains to a new holder device for inserting a credit card or debit card into a card reader. The device includes a pair of arms that are pivotally coupled together and which are biased away from each other. The device includes a key ring that is disposed on the arms for carrying the arms on a user's keys or the like. The device includes a pair of domes, each coupled to a respective one of the arms. Each of the domes is comprised of a resiliently compressible material for gripping the credit card or debit card.

(2) Description of Related Art Including Information Disclosed Under 37 CFR 1.97 and 1.98

The prior art relates to holder devices including a card holder which comprises a hinge member and a plurality of grips each rotatably mounted to the hinge member for holding a plurality of credit cards. The prior art discloses a gripping device that comprises a curved member which includes a pair of arms that can be squeezed together for gripping objects. The prior art discloses a badge holder that comprises a pair of arms that are biased together and a pin disposed on one of the arms to engage a badge. The prior art discloses a card holder that includes an arm that is positionable in a locked position for holding a card. The prior art discloses a card holder that includes a clip with a pair of arms biased together and a clamp that is attached to the clip.

BRIEF SUMMARY OF THE INVENTION

An embodiment of the disclosure meets the needs presented above by generally comprising a pair of arms that is each pivotally coupled together having each of the arms being oriented parallel to each other. Each of the arms is biased apart from each other for having a credit card inserted between the arms. Each of the arms is urgeable to engage each other to compress the credit card between the pair of arms. In this way the credit card can be inserted into and removed from a credit card reader without requiring a user to touch the credit card reader. A key ring is disposed on the pair of arms such that the key ring can be attached to a user's keys for carrying the pair of arms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
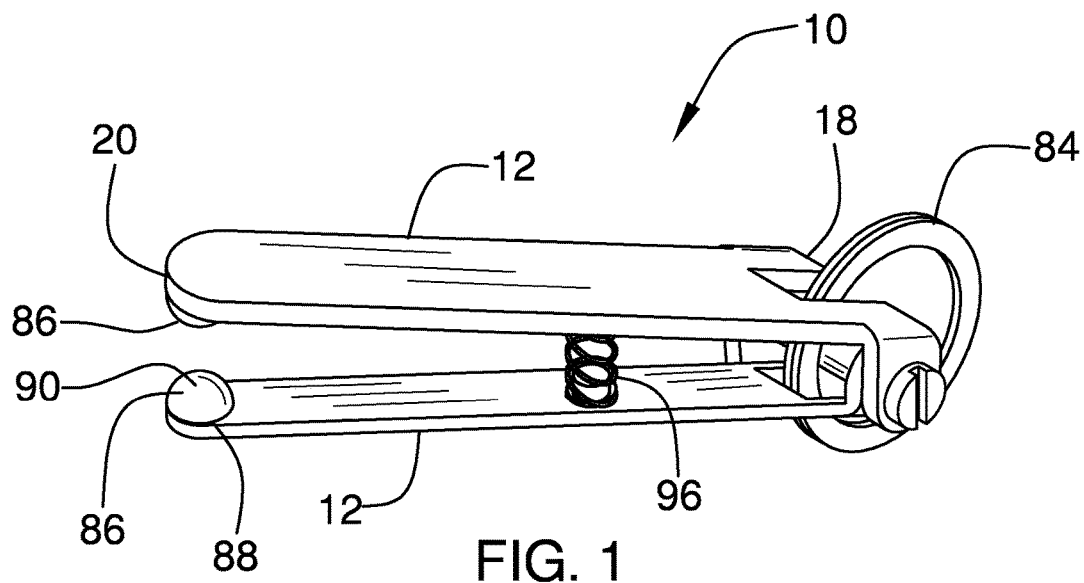
FIG. 1 is a perspective view of a credit card holder assembly according to an embodiment of the disclosure.
Figure 2:
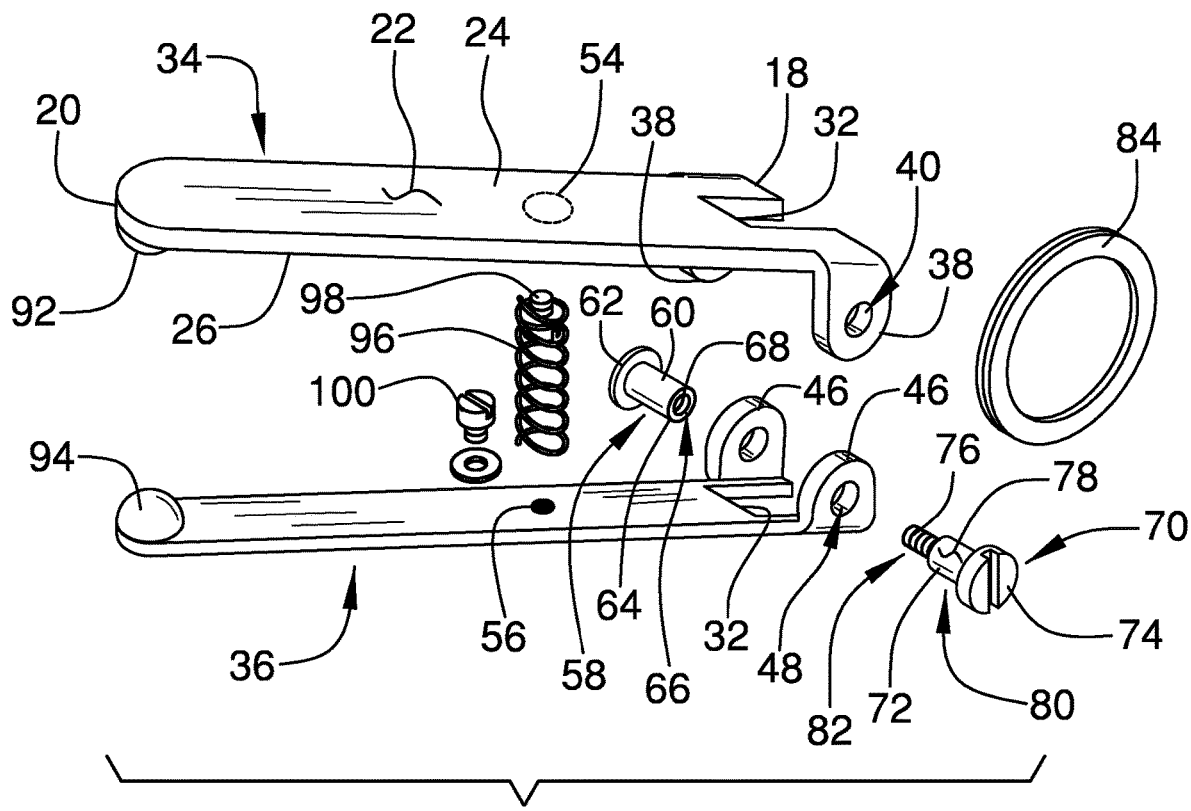
FIG. 2 is an exploded perspective view of an embodiment of the disclosure.
Figure 3:
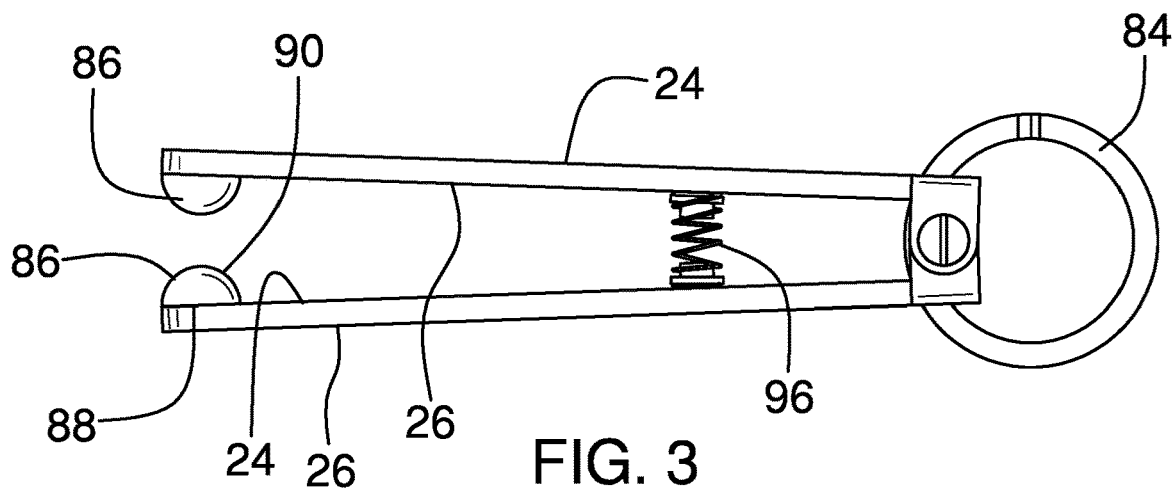
FIG. 3 is a left side view of an embodiment of the disclosure.
Figure 4:
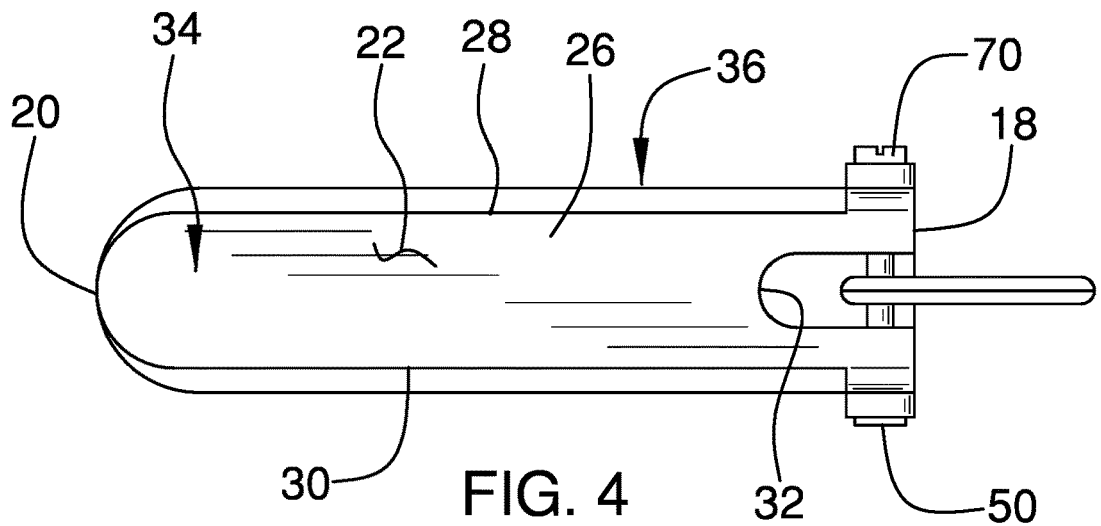
FIG. 4 is a bottom view of an embodiment of the disclosure.
Figure 5:
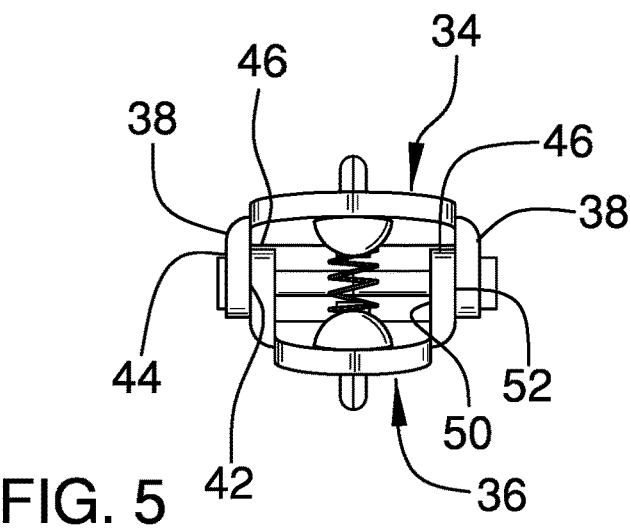
FIG. 5 is a front view of an embodiment of the disclosure.
Figure 6:
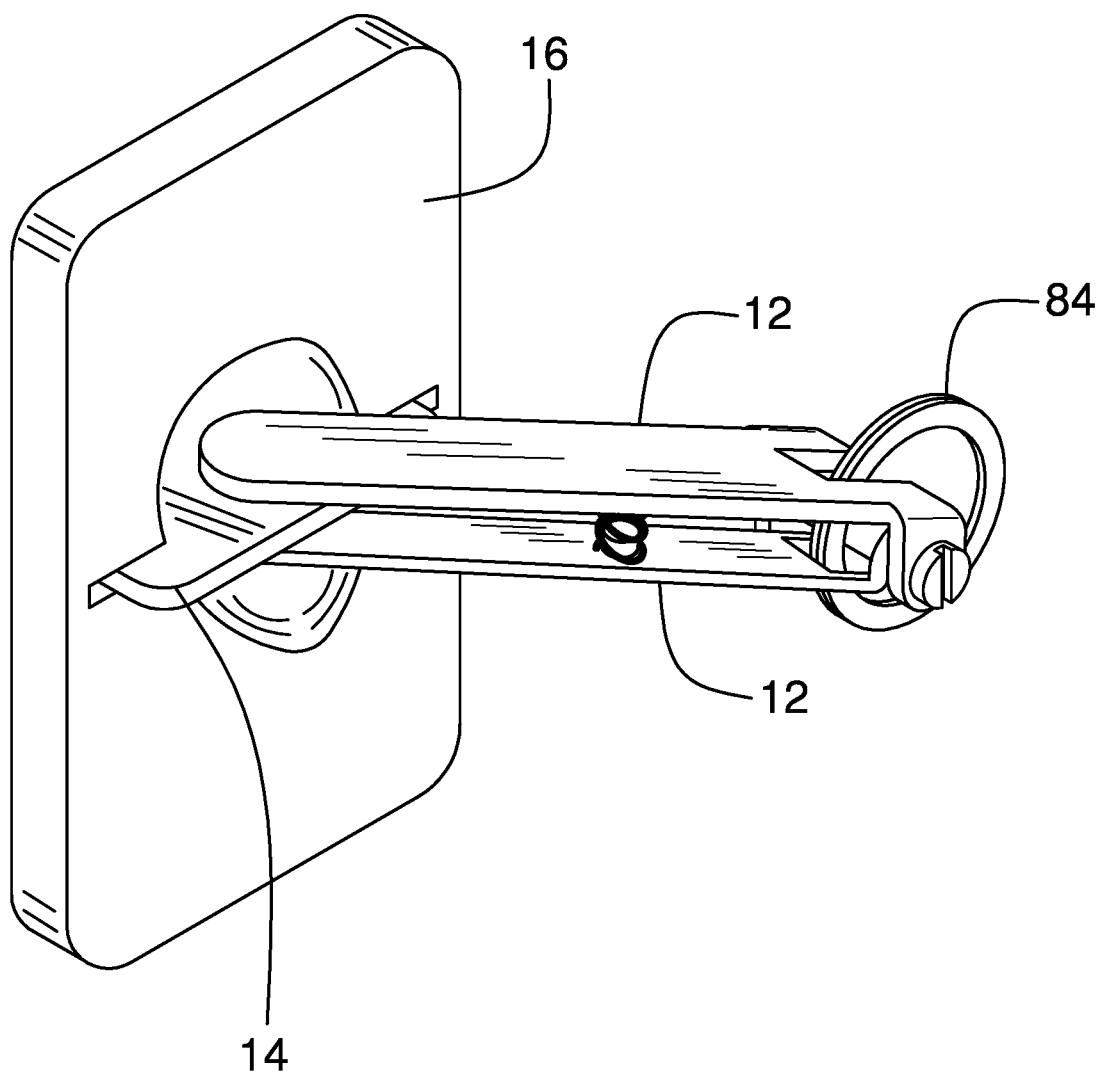
FIG. 6 is a perspective in-use view of an embodiment of the disclosure.

With reference now to the drawings, and in particular to FIGS. 1 through 6 thereof, a new holder device embodying the principles and concepts of an embodiment of the disclosure and generally designated by the reference numeral 10 will be described.

As best illustrated in FIGS. 1 through 6, the credit card holder assembly 10 generally comprises a pair of arms 12 that is each pivotally coupled together having each of the arms 12 being oriented parallel to each other. Each of the arms 12 is biased apart from each other to facilitate a credit card or a debit card 14 to be inserted between the arms 12. Each of the arms 12 is urgeable to engage each other to compress the credit card or a debit card 14 between the pair of arms 12. In this way the credit card or a debit card 14 can be inserted into and removed from a credit card reader 16 without requiring a user to touch the credit card reader 16.

Each of the arms 12 has a first end 18, a second end 20 and an outer surface 22 extending between the first end 18 and the second end 20, and the outer surface 22 of each of the arms 12 has a top side 24, a bottom side 26, a first lateral side 28 and a second lateral side 30. Each of the arms 12 is elongated between the first end 18 and the second end 20.

Furthermore, the second end 20 of each of the arms 12 is rounded and the first end 18 of each of the arms 12 is flat. Each of the arms 12 has a notch 32 extending from the first end 18 toward the second end 20 and the notch 32 in each of the arms 12 is centrally positioned on the first end 18.

The pair of arms 12 includes a top arm 34 and a bottom arm 36, and the top arm 34 has a width that is greater than a width of the bottom arm 36. The top arm 34 has a pair of first lobes 38 each extending downwardly from a respective one of the first lateral side 28 and the second lateral side 30 of the outer surface 22 of the top arm 34. Each of the first lobes 38 is positioned adjacent to the first end 18 of the top arm 34. Additionally, each of the first lobes 38 has a first hole 40 extending through a first surface 42 and a second surface 44 of the first lobes 38, and the first hole 40 in each of the first lobes 38 is aligned with each other.

The bottom arm 36 has a pair of second lobes 46 each extending upwardly from a respective one of the first lateral side 28 and the second lateral side 30 of the outer surface 22 of the bottom arm 36. Each of the second lobes 46 is positioned adjacent to the first end 18 of the bottom arm 36. Continuing, each of the second lobes 46 has a second hole 48 extending through a first surface 50 and a second surface 52 of the second lobes 46, and the second hole 48 in each of the second lobes 46 is aligned with each other.

The first surface 42 of each of the first lobes 38 extends downwardly along the second surface 52 of a respective one of the second lobes 46 having each of the first holes 40 being aligned with a respective one of the second holes 48. The bottom side 26 of the outer surface 22 of the top arm 34 has a first well 54 extending toward the top side 24 of the outer surface 22 of the top arm 34. The first well 54 is positioned between the first end 18 and the second end 20 of the top arm 34. The top side 24 of the outer surface 22 of the bottom arm 36 has a second well 56 extending toward the bottom side 26 of the outer surface 22 of the bottom arm 36. Additionally, the second well 56 is positioned between the first end 18 and the second end 20 of the bottom arm 36.

A first pin 58 is provided that has shaft 60 and a head 62, and the shaft 60 has a distal end 64 with respect to the head 62. The distal end 64 has a well 66 extending toward the head 62, the well 66 in the distal end 64 has a bounding surface 68 and the bounding surface 68 is threaded. The shaft 60 extends through the first hole 40 and the second hole 48 in a respective one of the first lobes 38 and the second lobes 46. Furthermore, the shaft 60 extends substantially across the notch 32 in each of the top arm 34 and the bottom arm 36 thereby pivotally attaching the top arm 34 to the bottom arm 36. Additionally, the head 62 has a diameter that is greater than a diameter of the first hole 40 and the second hole 48 thereby inhibiting the first pin 58 from passing through the first hole 40 and the second hole 48.

A second pin 70 is provided that has a shaft 72 and a head 74, and the shaft 72 of the second pin 70 has a distal end 76 with respect to the head 74 of the second pin 70. The shaft 72 of the second pin 70 has an outside surface 78, and the outside surface 78 has a first portion 80 which has a diameter that is greater than a diameter of a second portion 82. The second portion 82 extends from the distal end 76 of the shaft 72 of the second pin 70 toward the head 74 of the second pin 70, and the second portion 82 is threaded. The shaft 72 of the second pin 70 extends through the first hole 40 and the second hole 48 in a respective one of the first lobe 38 and the second lobe 46. Additionally, the second pin 70 extends substantially across the notch 32 in each of the top arm 34 and the bottom arm 36 thereby pivotally attaching the top arm 34 to the bottom arm 36.

The head 74 on the second pin 70 has a diameter which is greater than a diameter of the first hole 40 and the second hole 48 thereby inhibiting the second pin 70 from passing through the first hole 40 and the second hole 48. The second portion 82 of the outside surface 78 of the second pin 70 extends into the well 66 in the distal end 64 of the shaft 60 of the first pin 58. Furthermore, the second portion 82 of the outside surface 78 threadably engages the bounding surface 68 of the well 66 in the distal end 64 of the shaft 60 of the first pin 58 to attach the first pin 58 to the second pin 70. A key ring 84 is disposed on the pair of arms 12 and the key ring 84 can be attached to a user's keys for carrying the pair of arms 12. The key ring 84 has each of the first pin 58 and the second pin 70 extending through the key ring 84 such that the key ring 84 is positioned in the notch 32 in each of the top arm 34 and the bottom arm 36.

A pair of domes 86 is provided and each of the domes 86 has a lower side 88 and an upper side 90. The lower side 88 of each of the domes 86 is flattened and the upper side 90 of each of the domes 86 is rounded. The bottom side 26 of a first one of the domes 92 is coupled to the bottom side 26 of the outer surface 22 of the top arm 34 and the first dome 92 is positioned adjacent to the second end 20 of the top arm 34. The bottom side 26 of a second one of the domes 94 is coupled to the top side 24 of the outer surface 22 of the bottom arm 36 and the second dome 94 is positioned adjacent to the second end 20 of the bottom arm 36. Each of the first dome 92 and the second dome 94 is comprised of a resiliently compressible material. In this way the first dome 92 and the second dome 94 compress the credit card or debit card 14 when the top arm 34 and the bottom arm 36 are urged to engage each other for gripping the credit card or debit card 14.

A biasing member 96 is positioned between the arms 12 for biasing the arms 12 away from each other. The biasing member 96 extends between the top side 24 of the outer surface 22 of the bottom arm 36 and the bottom side 26 of the outer surface 22 of the top arm 34. The biasing member 96 may comprise a coil spring or other type of resiliently compressible biasing member 96. A first screw 98 is positioned inside of the biasing member 96. The first screw 98 threadably engages the first well 54 in the bottom side 26 of the outer surface 22 of the top arm 34 for attaching the biasing member 96 to the top arm 34. A second screw 100 is positioned inside of the biasing member 96 and the second screw 100 threadably engages the second well 56 in the bottom side 26 of the outer surface 22 of the top arm 34 for attaching the biasing member 96 to the top arm 34.

In use, the top arm 34 and the bottom arm 36 are pressed together to compress the credit card or debit card 14 between the domes 86. In this way the credit card or debit card 14 can be inserted into the card reader 16, such as an automatic teller machine, for example, without requiring the user to touch the card reader 16. In this way the likelihood of contact transmission of infectious diseases is reduced while employing the credit card or a debit card 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A credit card holder assembly for inserting and removing a credit card in a credit card reader, said assembly comprising:
   a pair of arms, each of said arms being pivotally coupled together having each of said arms being oriented parallel to each other, each of said arms being biased apart from each other wherein said pair of arms is configured to have a credit card inserted between said arms, each of said arms being urgeable to engage each other wherein said pair of arms is configured to compress the credit card between said pair of arms thereby facilitating the credit card to be inserted into and removed from a credit card reader without requiring a user to touch the credit card reader;
   a key ring being disposed on said pair of arms wherein said key ring is configured to be attached to a user's keys for carrying said pair of arms;
   wherein each of said arms has a first end, a second end and an outer surface extending between said first end and said second end, said outer surface of each of said arms having a top side, a bottom side, a first lateral side and a second lateral side, each of said arms being elongated between said first end and said second end, said second end of each of said arms being rounded, said first end of each of said arms being flat;
   wherein each of said arms having a notch extending from said first end toward said second end, said notch in each of said arms being centrally positioned on said first end; and
   wherein said pair of arms includes a top arm and a bottom arm, said top arm having a width being greater than a width of said bottom arm.

2. The assembly according to claim 1, wherein said top arm has a pair of first lobes each extending downwardly from a respective one of said first lateral side and said second lateral side of said outer surface of said top arm, each of said first lobes being positioned adjacent to said first end of said top arm, each of said first lobes having a first hole extending through a first surface and a second surface of said first lobes, said first hole in each of said first lobes being aligned with each other.

3. The assembly according to claim 2, wherein:
   said bottom arm has a pair of second lobes each extending upwardly from a respective one of said first lateral side and said second lateral side of said outer surface of said bottom arm, each of said second lobes being positioned adjacent to said first end of said bottom arm, each of said second lobes having a second hole extending through a first surface and a second surface of said second lobes, said second hole in each of said second lobes being aligned with each other; and
   said first surface of each of said first lobes extends downwardly along said second surface of a respective one of said second lobes having each of said first holes being aligned with a respective one of said second holes.

4. The assembly according to claim 3, wherein:
   said bottom side of said outer surface of said top arm has a first well extending toward said top side of said outer surface of said top arm, said first well being positioned between said first end and said second end of said top arm;
   said top side of said outer surface of said bottom arm having a second well extending toward said bottom side of said outer surface of said bottom arm, said second well being positioned between said first end and said second end of said bottom arm.

5. The assembly according to claim 4, further comprising:
   a biasing member being positioned between said arms for biasing said arms away from each other, said biasing member extending between said top side of said outer surface of said bottom arm and said bottom side of said outer surface of said top arm;
   a first screw being positioned inside of said biasing member, said first screw threadably engaging said first well in said bottom side of said outer surface of said top arm for attaching said biasing member to said top arm; and
   a second screw being positioned inside of said biasing member, said second screw threadably engaging said second well in said bottom side of said outer surface of said top arm for attaching said biasing member to said top arm.

6. The assembly according to claim 3, further comprising:
   a first pin having shaft and a head, said shaft having a distal end with respect to said head, said distal end having a well extending toward said head, said well in said distal end having a bounding surface, said bounding surface being threaded;
   said shaft extends through said first hole and said second hole in a respective one of said first lobes and said second lobes having said shaft extending substantially across said notch in each of said top arm and said bottom arm thereby pivotally attaching said top arm to said bottom arm; and
   said head has a diameter being greater than a diameter of said first hole and said second hole thereby inhibiting said first pin from passing through said first hole and said second hole.

7. The assembly according to claim 6, further comprising:
   a second pin having a shaft and a head, said shaft of said second pin having a distal end with respect to said head of said second pin, said shaft of said second pin having an outside surface, said outside surface having a first portion having a diameter being greater than a diameter of a second portion, said second portion extending from said distal end of said shaft of said second pin toward said head of said second pin, said second portion being threaded; and
   said shaft of said second pin extends through said first hole and said second hole in a respective one of said first lobe and said second lobe having said second pin extending substantially across said notch in each of said top arm and said bottom arm thereby pivotally attaching said top arm to said bottom arm, said head on said second pin having a diameter being greater than a diameter of said first hole and said second hole thereby inhibiting said second pin from passing through said first hole and said second hole.

8. The assembly according to claim 7, wherein said second portion of said outside surface of said second pin extends into said well in said distal end of said shaft of said first pin, said second portion of said outside surface threadably engaging said bounding surface of said well in said distal end of said shaft of said first pin to attach said first pin to said second pin.

9. The assembly according to claim 7, wherein said key ring has each of said first pin and said second pin extending through said key ring such that said key ring is positioned in said notch in each of said top arm and said bottom arm.

10. The assembly according to claim 1, wherein:
said assembly includes a pair of domes, each of said domes having a lower side and a upper side, said lower side of each of said domes being flattened, said upper side of each of said domes being rounded;
said bottom side of a first one of said domes being coupled to said bottom side of said outer surface of said top arm, said first dome being positioned adjacent to said second end of said top arm;
said bottom side of a second one of said domes being coupled to said top side of said outer surface of said bottom arm, said second dome being positioned adjacent to said second end of said bottom arm; and
each of said first dome and said second dome is comprised of a resiliently compressible material wherein each of said first dome and said second dome is configured to compress the credit card when said top arm and said bottom arm are urged to engage each other for gripping the credit card.

11. A credit card holder assembly for inserting and removing a credit card in a credit card reader, said assembly comprising:
a pair of arms, each of said arms being pivotally coupled together having each of said arms being oriented parallel to each other, each of said arms being biased apart from each other wherein said pair of arms is configured to have a credit card inserted between said arms, each of said arms being urgeable to engage each other wherein said pair of arms is configured to compress the credit card between said pair of arms thereby facilitating the credit card to be inserted into and removed from a credit card reader without requiring a user to touch the credit card reader, each of said arms having a first end, a second end and an outer surface extending between said first end and said second end, said outer surface of each of said arms having a top side, a bottom side, a first lateral side and a second lateral side, each of said arms being elongated between said first end and said second end, said second end of each of said arms being rounded, said first end of each of said arms being flat, each of said arms having a notch extending from said first end toward said second end, said notch in each of said arms being centrally positioned on said first end, said pair of arms including a top arm and a bottom arm, said top arm having a width being greater than a width of said bottom arm, said top arm having a pair of first lobes each extending downwardly from a respective one of said first lateral side and said second lateral side of said outer surface of said top arm, each of said first lobes being positioned adjacent to said first end of said top arm, each of said first lobes having a first hole extending through a first surface and a second surface of said first lobes, said first hole in each of said first lobes being aligned with each other, said bottom arm having a pair of second lobes each extending upwardly from a respective one of said first lateral side and said second lateral side of said outer surface of said bottom arm, each of said second lobes being positioned adjacent to said first end of said bottom arm, each of said second lobes having a second hole extending through a first surface and a second surface of said second lobes, said second hole in each of said second lobes being aligned with each other, said first surface of each of said first lobes extending downwardly along said second surface of a respective one of said second lobes having each of said first holes being aligned with a respective one of said second holes, said bottom side of said outer surface of said top arm having a first well extending toward said top side of said outer surface of said top arm, said first well being positioned between said first end and said second end of said top arm, said top side of said outer surface of said bottom arm having a second well extending toward said bottom side of said outer surface of said bottom arm, said second well being positioned between said first end and said second end of said bottom arm;
a first pin having shaft and a head, said shaft having a distal end with respect to said head, said distal end having a well extending toward said head, said well in said distal end having a bounding surface, said bounding surface being threaded, said shaft extending through said first hole and said second hole in a respective one of said first lobes and said second lobes having said shaft extending substantially across said notch in each of said top arm and said bottom arm thereby pivotally attaching said top arm to said bottom arm, said head having a diameter being greater than a diameter of said first hole and said second hole thereby inhibiting said first pin from passing through said first hole and said second hole;
a second pin having a shaft and a head, said shaft of said second pin having a distal end with respect to said head of said second pin, said shaft of said second pin having an outside surface, said outside surface having a first portion having a diameter being greater than a diameter of a second portion, said second portion extending from said distal end of said shaft of said second pin toward said head of said second pin, said second portion being threaded, said shaft of said second pin extending through said first hole and said second hole in a respective one of said first lobe and said second lobe having said second pin extending substantially across said notch in each of said top arm and said bottom arm thereby pivotally attaching said top arm to said bottom arm, said head on said second pin having a diameter being greater than a diameter of said first hole and said second hole thereby inhibiting said second pin from passing through said first hole and said second hole, said second portion of said outside surface of said second pin extending into said well in said distal end of said shaft of said first pin, said second portion of said outside surface threadably engaging said bounding surface of said well in said distal end of said shaft of said first pin to attach said first pin to said second pin;
a key ring being disposed on said pair of arms wherein said key ring is configured to be attached to a user's keys for carrying said pair of arms, said key ring having each of said first pin and said second pin extending through said key ring such that said key ring is positioned in said notch in each of said top arm and said bottom arm;
a pair of domes, each of said domes having a lower side and a upper side, said lower side of each of said domes being flattened, said upper side of each of said domes being rounded, said bottom side of a first one of said domes being coupled to said bottom side of said outer surface of said top arm, said first dome being positioned adjacent to said second end of said top arm, said bottom side of a second one of said domes being coupled to said top side of said outer surface of said bottom arm, said second dome being positioned adjacent to said second end of said bottom arm, each of said first dome and said second dome being comprised of a resiliently compressible material wherein each of said first dome and said second dome is configured to compress the credit card when said top arm and said bottom arm are urged to engage each other for gripping the credit card;

a biasing member being positioned between said arms for biasing said arms away from each other, said biasing member extending between said top side of said outer surface of said bottom arm and said bottom side of said outer surface of said top arm;

a first screw being positioned inside of said biasing member, said first screw threadably engaging said first well in said bottom side of said outer surface of said top arm for attaching said biasing member to said top arm; and a second screw being positioned inside of said biasing member, said second screw threadably engaging said second well in said bottom side of said outer surface of said top arm for attaching said biasing member to said top arm.

* * * * *